United States Patent
Sannino et al.

(10) Patent No.: US 10,157,166 B2
(45) Date of Patent: Dec. 18, 2018

(54) METHOD AND SYSTEM FOR MEASURING THE PERFORMANCE OF A DIAGNOSER

(71) Applicant: THALES, Neuilly sur Seine (FR)

(72) Inventors: Christian Sannino, Toulouse (FR); Fabien Kuntz, Toulouse (FR); Eric Laurent, Colomiers (FR)

(73) Assignee: THALES, Courbevoie (FR)

( * ) Notice: Subject to any disclaimer, the term of this patent is extended or adjusted under 35 U.S.C. 154(b) by 622 days.

(21) Appl. No.: 13/935,959

(22) Filed: Jul. 5, 2013

(65) Prior Publication Data
US 2014/0012542 A1 Jan. 9, 2014

(30) Foreign Application Priority Data
Jul. 5, 2012 (FR) .................................. 12 01895

(51) Int. Cl.
| *G06F 11/07* | (2006.01) |
| *G06F 11/22* | (2006.01) |
| *G06F 17/00* | (2006.01) |
| G06F 11/34 | (2006.01) |
| G05B 23/02 | (2006.01) |

(52) U.S. Cl.
CPC .......... *G06F 17/00* (2013.01); *G06F 11/2257* (2013.01); *G05B 23/0283* (2013.01); *G06F 11/079* (2013.01); *G06F 11/0739* (2013.01); *G06F 11/3447* (2013.01); *G06F 11/3466* (2013.01)

(58) Field of Classification Search
CPC .......................... G06F 11/3447; G06F 11/3466
USPC .............................................. 702/183; 703/8
See application file for complete search history.

(56) References Cited

U.S. PATENT DOCUMENTS

| 8,732,100 B2 * | 5/2014 | Blowers ............... G06N 99/005 706/12 |
| 2005/0015217 A1 * | 1/2005 | Weidl ..................... G05B 17/02 702/185 |

(Continued)

FOREIGN PATENT DOCUMENTS

FR 2954537 A1 6/2011

OTHER PUBLICATIONS

MIL-STD-2165 AMSC No. N3423 Jan. 26, 1985.*
"1522-2004; 1522-2004", IEEE Draft; 1522-2004, IEEE-SA, vol. scc20.dmc, Jan. 2006, pp. 1-42.

*Primary Examiner* — Mohamed Charioui
*Assistant Examiner* — Terence Stifter, Jr.
(74) *Attorney, Agent, or Firm* — Baker & Hostetler LLP

(57) ABSTRACT

A method and a device for measuring the performance of a diagnoser of a system under diagnosis, which comprises a knowledge base comprising a set of failures of the system, of effects observed and of relations between failures and effects observed, and an algorithmic core. The method comprises a step of calculating a specific detection rate and a specific location rate for the knowledge base, respectively referred to as expected detection rate and expected location rate. It also comprises a step of calculating a specific detection rate and a specific location rate for the set consisting of knowledge base and algorithmic core, respectively referred to as detection rate obtained and location rate obtained; and a step of calculating the performance of the diagnoser as a function of the expected and obtained detection rates and of the expected and obtained location rates.

9 Claims, 7 Drawing Sheets

(56) References Cited

U.S. PATENT DOCUMENTS

| | | | | |
|---|---|---|---|---|
| 2008/0256404 A1* | 10/2008 | Funatsu | ......... | G01R 31/318342 |
| | | | | 714/724 |
| 2009/0112379 A1* | 4/2009 | Geiter | ................... | G06F 11/079 |
| | | | | 701/3 |
| 2013/0179129 A1* | 7/2013 | Patankar | ............ | G05B 23/0243 |
| | | | | 703/2 |
| 2013/0317780 A1* | 11/2013 | Agarwal | ............ | G05B 23/0248 |
| | | | | 702/181 |

* cited by examiner

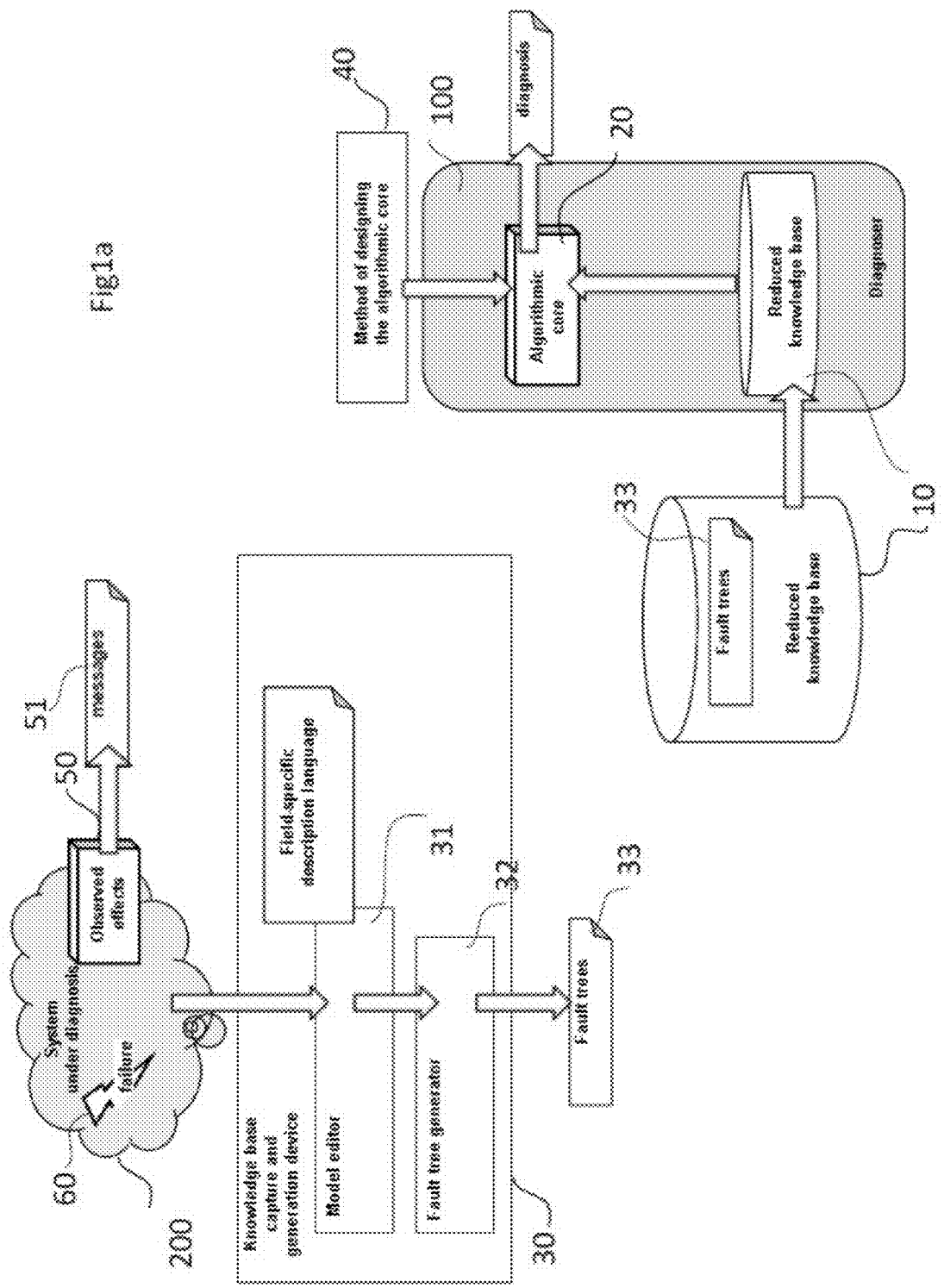

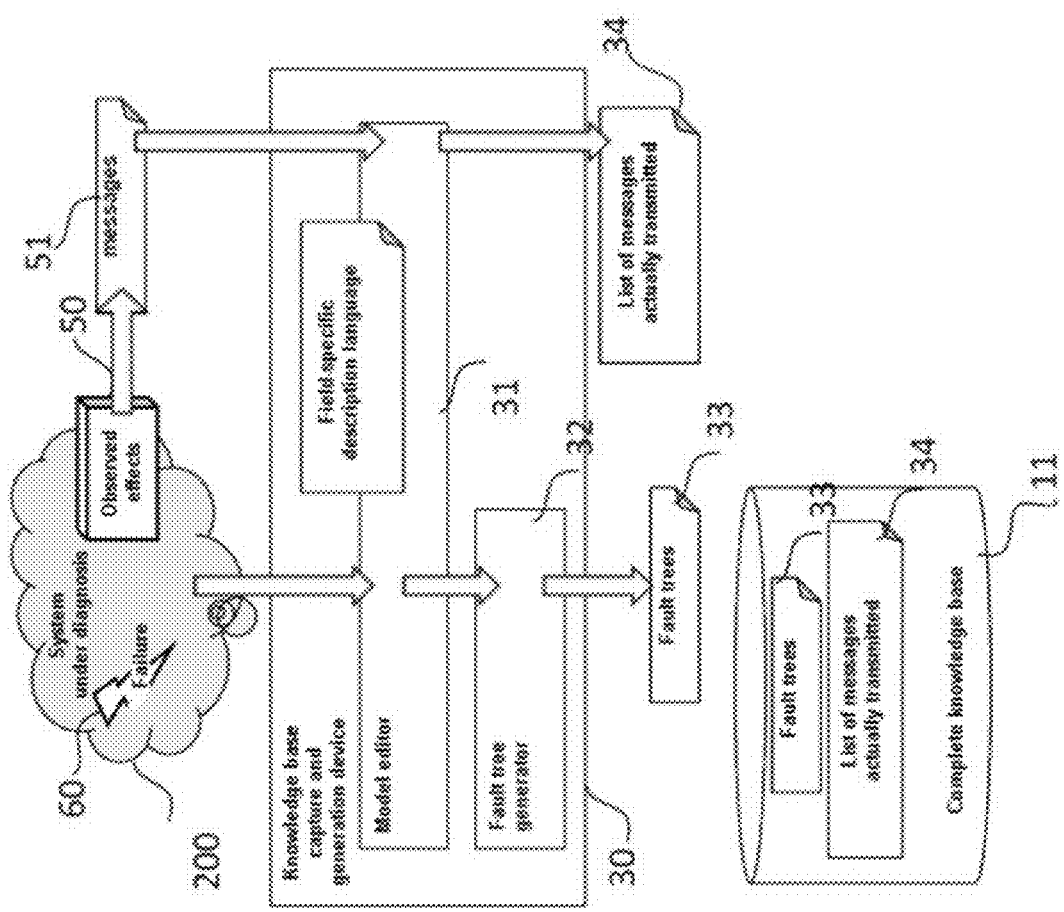

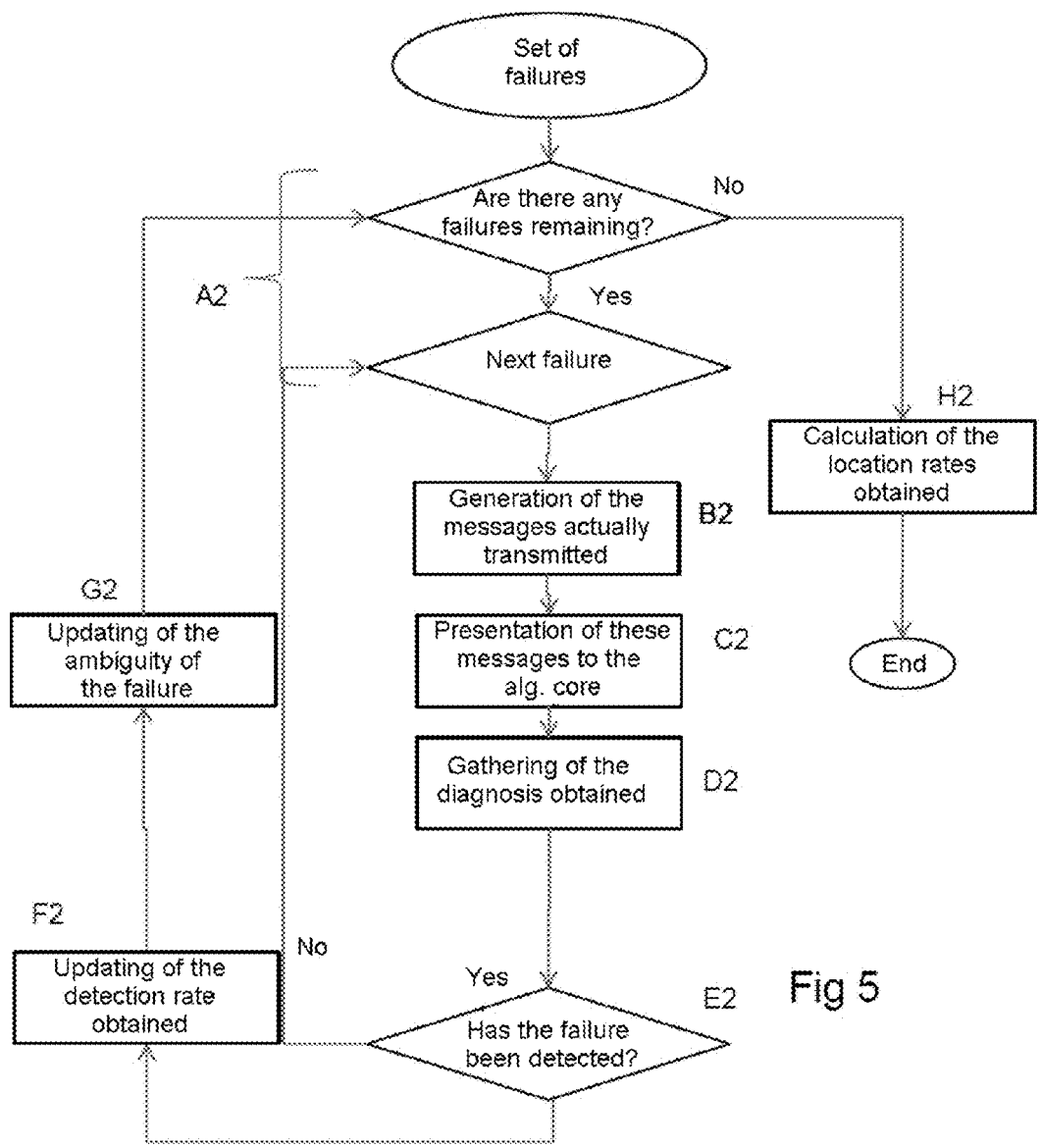

METHOD AND SYSTEM FOR MEASURING THE PERFORMANCE OF A DIAGNOSER

CROSS-REFERENCE TO RELATED APPLICATION

This application claims priority to foreign French patent application No. FR 1201895, filed on Jul. 5, 2012, the disclosure of which is incorporated by reference in its entirety.

FIELD OF THE INVENTION

The field of the invention is that of maintenance systems notably in their diagnosis function provided by a diagnoser.

BACKGROUND

Diagnosis is defined as the reasoning process making it possible to search for the failure or failures (also referred to as root causes) that may explain the observation of a set of effects. As in any reasoning process, diagnosis implements a calculation, the reasoning proper, and a knowledge set, often expressed in the form of relations between the failures and the effects observed.

This knowledge set is grouped together in a knowledge base. As shown in FIG. 1b, the diagnosis is carried out by a calculator also referred to as algorithmic core 20, with the help of the knowledge base 10 and of messages 51 bearing the information about the effects 50 observed on the system 200 by virtue of detection devices (sensors, testers, comparators, etc.). The information borne by the messages 51 is "the effect is present" or "the effect is absent", as well as the address of the corresponding effect in the knowledge base.

The set consisting of knowledge base 10 and algorithmic core 20 is referred to as a diagnoser 100.

FIG. 1a illustrates a knowledge base generation method, known to the person skilled in the art.

The information constituting the knowledge base is initialized by the designer of the system under diagnosis 200 with the aid of a specific language suited to the field of maintenance. This language makes it possible to describe the relations between the failures 60 and the observed effects 50 as well as the messages 51 transmitted to the diagnoser of the system under diagnosis.

The current complexity of systems under diagnosis no longer allows system designers to establish intellectually the relations between the failures of their system and the observed effects. A model editor 31 allows the designer of the system under diagnosis to express with the aid of the field-specific description language, the behaviour of the components of the system under diagnosis 200, the relations between their failures 60, the observed effects 50 and the messages 51. The set of relations between an effect and its cause(s) (or failure(s)) is often referred to as the fault tree 33 of this effect; the relations between a failure and its effect(s) is called the "signature" of this failure.

These relations are illustrated by the example given with FIG. 2 which shows a set of failures C1, C2, C3 referenced 60 and their observed effects E1, E2, E3, referenced 50 as well as a failure C4 which has no observed effect. In principle, it is not possible to have an observed effect without a failure.

With the help of these relations between failures 60 and effects 50 it is possible to define the following signatures:
the signature of C1 Sig(C1) is {E1, E2, notE3},
the signature of C2 Sig(C2) is {E1, E2, notE3}, and
the signature of C3 Sig(C3) is {E1, E2, E3}.

The fact that the effect Ex does not originate from a failure is indicated by "notEx". For example here, the signature of C1 indicates that C1 produces the effect E1 and the effect E2 but does not produce the effect E3.

There are thus two failures C1 and C2 which have the same signature and which are therefore not distinguishable.

With the help of these logical relations between the failures and the effects, fault trees AF are also defined.

In this example presented here:
AF (E1)=C1 or C2 or C3
AF (E2)=C1 or C2 or C3
AF (E3)=C3

The set of these relations, that is to say of these fault trees and signatures, constitutes the knowledge base. It may be noted that the fault trees can be viewed as the description of a knowledge base made with the help of the effects while the signatures can be seen as the description of a knowledge base made with the help of the causes.

The knowledge base 10 is generated by means of a knowledge base capture and generation device 30. The knowledge base 10, used by the diagnoser 100, contains the fault trees 33 produced by a fault tree 33 generator 32.

The operation of the algorithmic core 20 associated with the knowledge base 10 is now recalled in relation to FIG. 1b.

When the diagnoser is undertaking the diagnosis of a system 200, the failures of the system under diagnosis 60 produce the observed effects 50; these observed effects are transformed into messages 51 which are dispatched directly to the algorithmic core 20, which with the aid of the knowledge base 10 establishes a diagnosis.

The search for a diagnosis amounts to searching through the set of fault trees associated with the set of observed effects 50 for the values "True" or "False" of the failures 60 which explain the value "True" of the set of observed effects 50 which is contained in the messages 51.

In the example of FIG. 2, if the observed effects are E2 and E3, the messages 51 "E2 is present" and "E3 is present" are dispatched to the algorithmic core which extracts the respective fault trees of E2 and E3 from the knowledge base, and then calculates the associated expression "AF(E2) and AF(E3) " which equals: (C1 or C2 or C3) and C3.

The explanation for the presence of E2 and E3 is therefore as follows:
C3 is true,
or C1 and C3 are true,
or C2 and C3 are true.

In mathematical language this operation is called a "logical satisfiability search". In the field of diagnosis, the result of this search can be expressed in the following manner. In view of the observed effects E2 and E3, the explanation is as follows:
The failure C3 is present,
or the failures C1 and C3 are both present,
or the failures C2 and C3 are both present.

Within the framework of this invention, one is endeavouring to measure the performance of the diagnoser 100. The system 200 is not undergoing diagnosis during the measurement of the performance of the diagnoser 100.

According to the prior art, the performance of a diagnoser is usually defined by means of a failure detection rate and location rate (for simplicity, the term "location rate" will be used).

The calculation of these rates is for example described in the testability calculation standards MIL-STD 2165 (Appendix A paragraph 50.7.3) or IEEE Std 1522.

The detection rate is calculated as the ratio of the number of failures 60 producing an observed effect 50 to the total number of potential failures contained by the system under diagnosis 200.

The location rate is related to the number of failures which produce identical observed effects and which therefore are not distinguishable.

The sets of failures which are not distinguishable are called an "ambiguity group". In our example, C1 and C2 which have the same observed effects, that is to say the same signature, form an ambiguity group.

The location rate for 1, 2, 3, ... N failures is customarily defined.

The location rates are calculated with the ratio of the number of failures of an ambiguity group to the number of detected failures. The location rate for 1 failure is defined as the ratio of the number of failures distinguishable in a unique manner to the total number of detectable failures; the location rate for 2 failures is defined as the ratio of the number of failures distinguishable pairwise to the total number of detectable failures; and so on and so forth.

These calculations are illustrated in conjunction with the example of FIG. 2.

C4 does not produce any effect. C1, C2, C3 are detectable, C4 not. The detection rate, such as defined, is obtained by calculating the number of observable failures, divided by the total number of failures, i.e. ¾: the detection rate is 75%.

C1 and C2 are not distinguishable since they have the same signature. Their ambiguity is therefore 2.

The signature of C3 is unique, the ambiguity of C3 is therefore 1.

The location rates such as defined will be calculated in the following manner:
the location rate of a single failure is ⅓ i.e. 33%,
the location rate of failures pairwise is ⅔ i.e. 66%.

The manner of calculation described hereinabove in accordance with the prior art relies on the signatures extracted from the knowledge base indicating which are the values "effects produced" or "effect not produced" associated with the failure. This signifies specifically that the calculation scheme according to the prior art evaluates the performance allowed by the knowledge base but does not reflect the actual performance of the diagnoser which bases its diagnosis on the information actually transmitted by the messages 51 received by it.

In addition to this weakness, the rates are usually defined in the prior art in a global manner for the diagnoser as a whole. The ambiguity information is synthesized in the calculations of the rates. In this manner, the improvement in the performance of the diagnoser can only be processed globally without making it possible to target exactly where the effort to improve the performance should be produced.

SUMMARY OF THE INVENTION

The aim of the invention is to obtain a more precise diagnoser.

More precisely the subject of the invention is a method for measuring the performance of a diagnoser of a system under diagnosis which comprises:
a knowledge base comprising a set of failures of the system, of effects observed on the system caused by these failures, and of relations between failures and effects observed, and
an algorithmic core linked to the said knowledge base.
It is mainly characterized in that it comprises:

a step of calculating a specific detection rate and a specific location rate for the knowledge base alone, respectively referred to as expected detection rate and expected location rate,
with the help of messages actually transmitted to the diagnoser and predetermined, carrying information about the observed effects, a step of calculating a specific detection rate and a specific location rate for the set consisting of knowledge base and algorithmic core, respectively referred to as detection rate obtained and location rate obtained,
a step of calculating the performance of the diagnoser as a function of the expected and obtained detection rates and of the expected and obtained location rates, these calculation steps being carried out by a device for measuring the performance of the diagnoser, linked to a copy of the knowledge base.

In this manner, the algorithmic core, with the help of the knowledge base at its disposal, produces a diagnosis which, for each known failure, makes it possible to identify for which failure the algorithmic core does not have the expected performance.

According to a characteristic of the invention, the calculation of the expected detection and location rates comprises the following sub-steps:
for each failure of the copy of the knowledge base, termed the current failure:
if there exists at least one observed effect, then:
calculation of the expected detection rate,
assignment of this current failure to an ambiguity group which groups together the failures having the same signature,
else, calculation of the expected detection rate,
when all the failures have been evaluated, calculation of the expected location rates as a function of the ambiguities.

According to another characteristic of the invention, the calculation of the obtained detection and location rates comprises the following sub-steps:
for each failure termed the current failure of the copy of the knowledge base,
with the help of the messages actually transmitted, extraction of the message actually transmitted for this current failure,
if the message is not empty, then:
dispatching of this message actually transmitted to the algorithmic core,
gathering of the diagnosis provided by the algorithmic core, this diagnosis being "no failure diagnosed", or "a single failure diagnosed" or "several failures diagnosed",
if no failure has been diagnosed, then calculation of the detection rate obtained,
else, at least one failure having been diagnosed, calculation of the detection rate obtained, calculation of the ambiguity of the current failure,
else (the message is empty), calculation of the detection rate obtained,
when all the failures have been evaluated, calculation of the obtained location rates according to the computed ambiguities.

The performance of the diagnoser is for example measured by calculating a detection efficiency defined by the ratio of obtained detection rate to expected detection rate, and a location efficiency defined by the ratio of obtained location rate to expected location rate.

The subject of the invention is also a device for measuring the performance of a diagnoser of a system under diagnosis which comprises a knowledge base comprising a set of failures (60) of the system, of effects observed on the system caused by these failures, and of relations between failures and effects observed, and an algorithmic core, characterized in that the said device comprises means for implementing the method such as described, linked to a copy of the knowledge base and to a list of the messages actually transmitted.

The means for implementing the method typically comprise signature extraction means, means for calculating the expected and obtained rates and means for calculating the performance obtained; and optionally a module for defining actually transmitted messages.

The subject of the invention is also a computer program product, the said computer program comprising code instructions making it possible to perform the steps of the method such as described, when the said program is executed on a computer.

BRIEF DESCRIPTION OF THE DRAWINGS

Other characteristics and advantages of the invention will become apparent on reading the detailed description which follows, given by way of nonlimiting example and with reference to the appended drawings in which:

FIG. 5 is a flowchart presenting the main steps of calculating the obtained detection and location rates, according to the invention.

From one figure to the next, the same elements are tagged by the same references.

DETAILED DESCRIPTION

It has been seen that the detection and location rates are utilized to evaluate the performance of the knowledge base—algorithmic core pair. In fact, these rates, which are defined with the help of the known relations between failures and effects of the knowledge base, rely on the signatures and/or fault trees extracted from the knowledge base and are therefore only representative of the performance that the knowledge base makes it possible to obtain. This has the consequence of not explicitly identifying the weaknesses due to the algorithmic core itself, nor the parts of the system under diagnosis which would be responsible for overly low rates.

This performance does not therefore reflect the actual performance of the diagnoser.

In contemporary embodiments, frequently in fact only the messages informing that an effect is present are transmitted. The messages actually transmitted to the diagnoser do not therefore always coincide with the messages corresponding to the signatures of the knowledge base. This is the case for example when the messages actually transmitted to the diagnoser contain the information regarding the presence of an effect, but not the information regarding the absence of an effect: "notE3" indicating that the effect E3 is absent is not dispatched to the diagnoser.

Thus, for the effect E3, only the message bearing the information "E3 is present" is transmitted, the message bearing the information "E3 is absent", written in the form "notE3" in the fault trees, is not transmitted.

In the case where the messages "E1 present" and "E2 present" are received, the diagnoser will establish its diagnosis by means of the conjunction of the following fault trees:

AF(E1) and AF(E2)=(C1 or C2 or C3) and (C1 or C2 or C3) i.e. the following diagnosis: C1 or C2 or C3.

The actual ambiguity obtained is therefore 3.

If the message "notE3" had been transmitted, the diagnoser would have calculated the conjunction of the following fault trees:

AF(E1) and AF(E2) and AF(notE3)=(C1 or C2 or C3) and (C1 or C2 or C3) and notC3.

Which gives C1 or C2, and an ambiguity of 2 in accordance with the ambiguity calculation provided by the conventional calculation of the location rates, based on the knowledge base.

Therefore there is indeed an ambiguity of value 2 in the example, given by the conventional calculation and, according to the invention an ambiguity of value 3 dependent on the actual conditions of the calculation and of the information actually transmitted to the diagnoser.

Figure 3B:
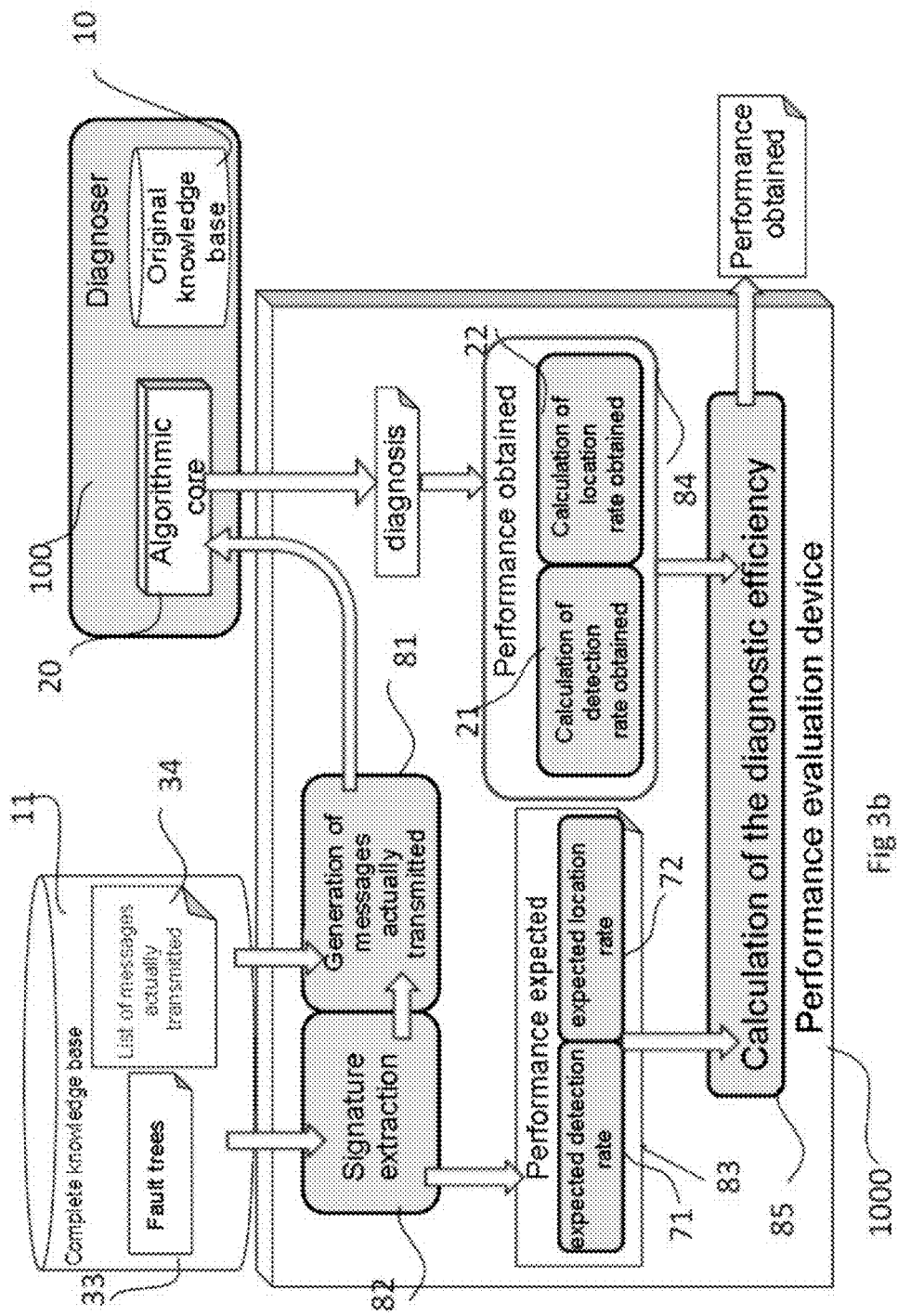

The method according to the invention described in relation notably with FIG. 3b allows a clear distinction to be made between:

the detection and location rates that the system under diagnosis 200 makes it possible to obtain by virtue of the detection devices (sensors, testers, comparators, etc.) that it comprises and of the interpretation, described in the knowledge base 10, of their results; these rates due to the quality of the knowledge base 10 are referred to as "expected detection and location rates" 71, 72;

the detection and location rates actually produced by the diagnoser, which are referred to as "detection and location rates obtained" 21, 22.

The quality of the algorithmic core is defined by an efficiency calculated by taking the ratio of the rate obtained to the expected rate. Low efficiency performance of this core could be due, for example, to poor utilization of the knowledge base or else to insufficient capture of the effects observation messages.

The diagnosability of the system under diagnosis is evaluated through the measurement of the knowledge base. Low performance of this base could be due, for example, to an insufficient number of detection devices or else to a placement of these detection devices not making it possible to distinguish between failures.

The calculation of these rates is based on a supplemented knowledge base (11) described in relation to FIG. 3a: this entails a copy of the knowledge base 10 called the original knowledge base, supplemented with messages actually transmitted 34 by the system under diagnosis, as shown in the figure. The supplemented knowledge base contains the same fault trees 33 and signatures as the original knowledge base, with in addition these messages actually transmitted. The list of messages actually transmitted 34 is provided by the designer of the system under diagnosis 200 during the capture of the knowledge bases.

Figure 4:
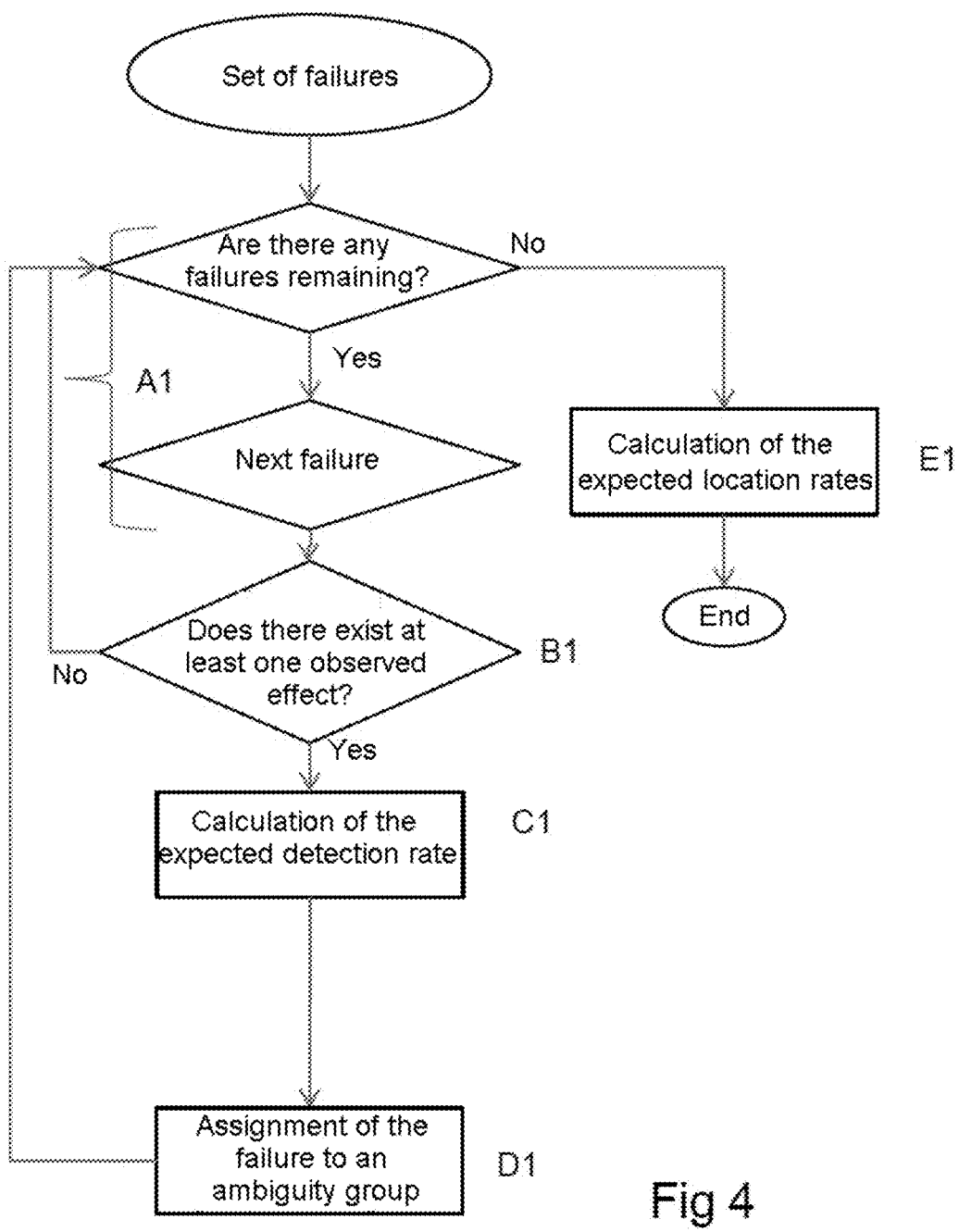

The expected detection and location rates 71, 72 are evaluated by a performance evaluation device 1000 without resorting to the diagnoser, in the following manner described in relation to FIG. 3b and the flowchart of FIG. 4, and illustrated in the example of FIG. 2.

For each failure of this supplemented knowledge base 11, termed the current failure:
  extract its signature from the supplemented knowledge base 11,
  if there exists at least one observed effect (=the signature is not "empty") then:
    calculation of the expected detection rate, that is to say of the number of failures detected/number of failures analysed,
    assignment of this current failure to an ambiguity group which groups together the failures having the same signature,
  else, calculation of the expected detection rate 11.
Calculation of the expected location rates.

It will be noted that the calculation of these expected rates does not call upon the messages actually transmitted and that these expected rates are therefore specific to the original knowledge base 10.

Figure 1B:
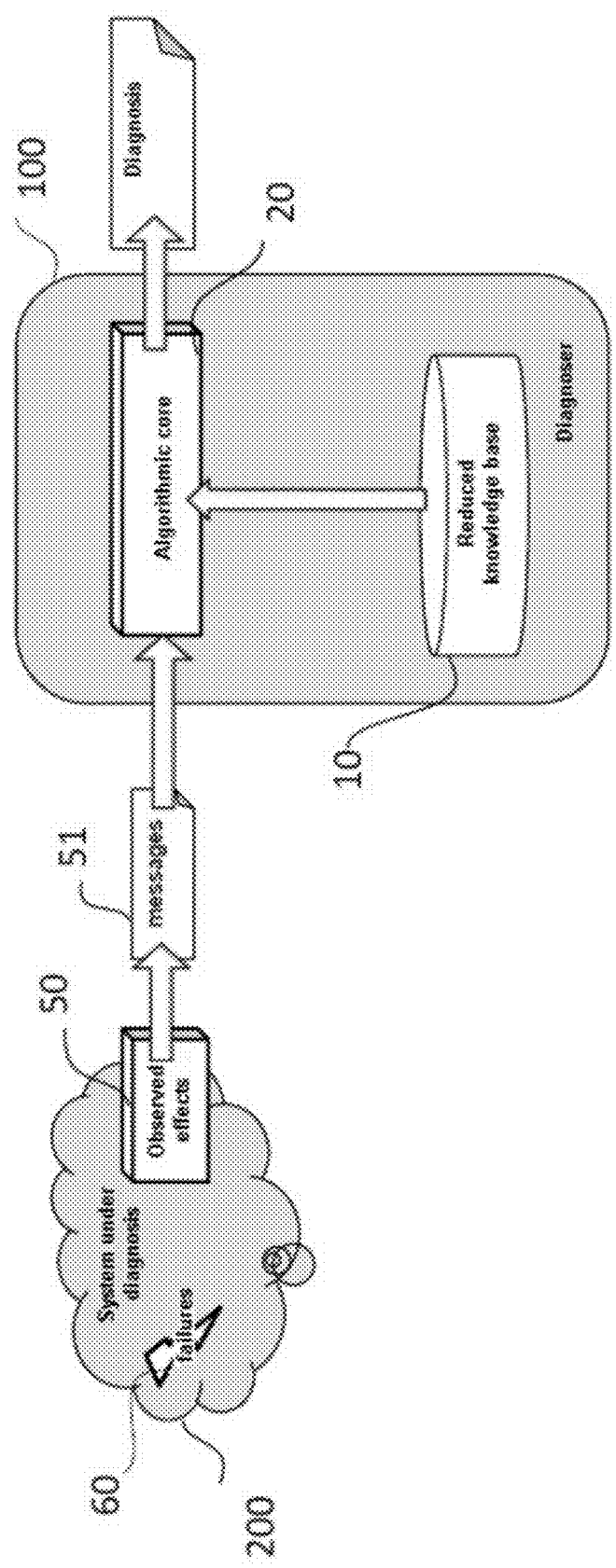
FIG. 1a already described represents schematically a diagnoser and its knowledge base generation device according to the prior art, FIG. 1b already described represents schematically a diagnoser in its operational work environment (i.e. in flight for example, the system under diagnosis being a system aboard an aircraft.)
Figure 2:
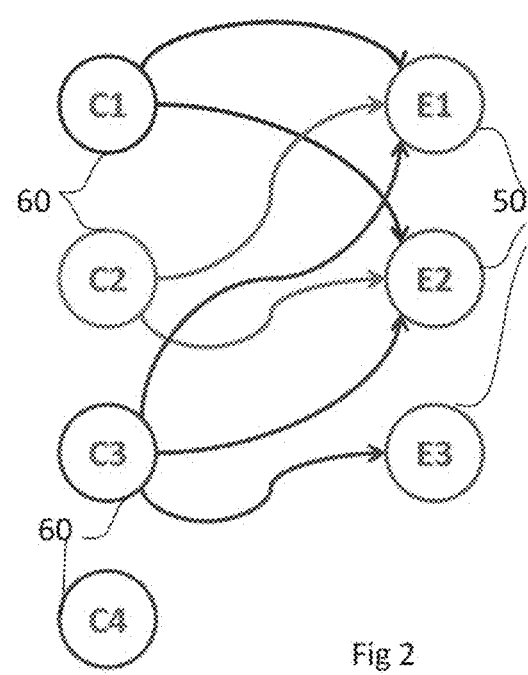
FIG. 2 already described illustrates the failures/effects relations, the calculation of signatures, and of detection and location rates according to the prior art, FIG. 3b schematically represents a global view of an exemplary device for evaluating the performance of a diagnoser, according to the invention, based on a complete knowledge base shown in FIG. 3a, FIG. 4 is a flowchart presenting the main steps of calculating the expected detection and location rates, according to the invention.

This evaluation of the expected detection and location rates will now be charted in the example of FIG. 2.
Step A1: Current failure=C1,
  Step B1: Does there exist at least one observed effect? yes, a signature Sig(C1)={E1, E2, notE3} has been found
  Step C1: 1 detected failure/1 analysed failure: the detection rate takes the value 1/1
  Step D1: the failure C1 is placed in the ambiguity group {E1, E2, notE3}
Step A1: Current failure=C2,
  Step B1: Does there exist at least one observed effect? yes, a signature {E1, E2, notE3} has been found
  Step C1: 2 detected failure/2 analysed failure: the detection rate takes the value 2/2
  Step D1: the failure C2 is placed in the ambiguity group {E1, E2, notE3}
Step A1: Current failure=C3,
  Step B1: Does there exist at least one observed effect? yes, a signature {Sig(C3)={E3} has been found,
  Step C1: 3 detected failure/3 analysed failure: the detection rate takes the value 3/3
  Step D1: the failure C3 is placed in the ambiguity group {E3}
Step A1: Current failure=C4,
  Step B1: Does there exist at least one observed effect? no Sig(C4)={ }
  Step C1: 3 detected failure/4 analysed failure: the detection rate takes the value 3/4.
Step E1:
  The ambiguity group {E1, E2, notE3} contains 2 failures
  The ambiguity group {E3} contains 1 failure
  Location rate 1 failure=1/3
  Location rate 2 failure=2/3
  Location rate 3 failure=0/3

The calculation yielding the ambiguity of each failure advantageously makes it possible to identify the failures whose effects are not observed sufficiently finely, doing so to guide the designer of the system under diagnosis 200 to increase the precision of the diagnostic device.

Preferably, if the expected detection and location rates do not correspond to the desired performance, the knowledge base capture device 30 is re-implemented so as to improve the knowledge base 10.

The detection and location rates obtained 21, 22 are evaluated by the performance evaluation device 1000 in the following manner described in relation to FIG. 3b and the flowchart of FIG. 5, and illustrated with the example of FIG. 2.

A module 81 for defining the message actually transmitted for a determined failure is linked to the performance evaluation device 1000; this module can be integrated into the device for evaluating performance as shown in FIG. 3b.

For each failure of the supplemented knowledge base 11, termed the current failure:
  extraction of the message actually transmitted for this current failure from the supplemented knowledge base 11, by means of the definition module 81,
  if the message is not empty, then
    presentation of this message to the diagnoser,
    gathering of the diagnosis
    if the current failure has been detected, then
      calculation of the detection rate obtained,
      assignment of this current failure to an ambiguity group which groups together the failures having the same signature,
    else (no failure detected) calculation of the detection rate obtained,
  else (the message is empty),
    calculation of the detection rate obtained.
Calculation of the obtained location rates.

The calculation of these obtained rates calls upon the supplemented base 11 (original base+messages actually transmitted), as well as upon the diagnoser as a whole.

This evaluation of the expected detection and location rates will now be charted in the example of FIG. 2.
Step A2: Current failure=C1.
  Step B2: message actually transmitted for C1: {E1present, E2 present}.
  Step C2: presentation of this message {E1present, E2 present} to the diagnoser.
    The diagnoser searches for the failure(s) corresponding to AF(E1) and AF(E2).
    AF(E1) and AF(E2)=(C1 or C2 or C3) and (C1 or C2 or C3).
  Step D2: The diagnosis is {C1, C2, C3}.
  Step E2: has the current failure C1 been detected? Yes
  Step F2: 1 detected failure/1 analysed failure: the detection rate takes the value 1/1.
  Step G2: the failure C1 is placed in the ambiguity group {C1, C2, C3} since the diagnoser does not know how to distinguish these three failures in the absence of the message "E3 absent".
Step A2: Current failure=C2.
  Step B2: message actually transmitted for C2: {E1present, E2 present}.
  Step C2: presentation of this message {E1present, E2 present} to the diagnoser.
    The diagnoser searches for the failure(s) corresponding to AF(E1) and AF(E2).
    AF(E1) and AF(E2)=(C1 or C2 or C3) and (C1 or C2 or C3);
  Step D2: The diagnosis is {C1, C2, C3}.
  Step E2: has the current failure C2 been detected? Yes.

Step F2: 2 detected failures/2 analysed failures: the detection rate takes the value 2/2.

Step G2: the failure C2 is placed in the ambiguity group {C1, C2, C3} since the diagnoser does not know how to distinguish these three failures in the absence of the message "E3 absent".

Step A2: Current failure=C3.

Step B2: message actually transmitted for C3: {E1present, E2 present, E3 present}

Step C2: presentation of this message {E1present, E2 present, E3 present} to the diagnoser.

The diagnoser searches for the failure(s) corresponding to AF(E1) and AF(E2) and AF(E3).

AF(E1) and AF(E2) and AF(E3)=(C1 or C2 or C3) and (C1 or C2 or C3) and C3.

Step D2: The diagnosis is {C1, C2, C3}.

Step E2: has the current failure C3 been detected, i.e. has a solution been proposed? Yes Step F2: 3 detected failures/3 analysed failures: the detection rate takes the value 3/3.

Step G2: the failure C3 is placed in the ambiguity group {C1,C2, C3}

Step A2: Current failure=C4

Step B2: message actually transmitted for C4: none

Step C2: no presentation of this message to the diagnoser.

Step D2: The diagnosis is empty.

Step E2: has the current failure C4 been detected? No.

Step F2: 3 detected failures/4 analysed failures: the detection rate takes the value 3/4.

Step G2: not relevant

Step H2:

The ambiguity group {C1, C2, C3} contains 3 failures,

Location rate 1 failure=0/3,

Location rate 2 failures=0/3,

Location rate 3 failures=3/3.

In this manner, the algorithmic core 20, by relying on the supplemented knowledge base 11, produces a diagnosis (detection and location rates obtained) which corresponds to the actual ambiguity group of the failure. The evaluation of the ambiguity being done for each known failure, it becomes easy to identify that failure for which the algorithmic core has poor efficiency.

According to an alternative, the messages actually transmitted are not hosted in the knowledge base 11, but outside in a file for example. The module 81 for defining the message actually transmitted for a determined failure is then linked to the knowledge base 11 and to the file of actually transmitted messages.

Generally, it is considered that the knowledge base 11 is associated with the actually transmitted messages, internally (hosted file) or externally (outside file).

Preferably, the quality of the algorithmic core is furthermore measured as an efficiency calculated by taking the ratio of the rate obtained to the expected rate, for the detection rate and for the location rate. We have:

detection efficiency=detection rate obtained/expected detection rate, location efficiency=location rate obtained/expected location rate.

Preferably, if the detection and location rates expected and/or obtained do not correspond to the desired performance, the knowledge base capture device 30 is re-implemented so as to improve the knowledge base 10. The same holds if the detection and/or location efficiencies are not satisfactory.

The system under diagnosis 200 can be hierarchically decomposed into several sub-systems as described in patent FR2954537. It then becomes beneficial to evaluate the diagnostic performance for each sub-system individually in order to determine those which merit evolutions.

For this purpose, the evaluation of the expected detection and location rates is applied to partial knowledge bases, each corresponding to a sub-system. This thus makes it possible to identify the parts of the system under diagnosis (the sub-systems) which would be responsible for overly low rates.

The present invention can be deployed with the help of hardware and/or software elements. It can be available as a computer program product on a medium readable by computer, the said computer program comprising code instructions making it possible to perform the steps of the method as described. The medium can be electronic, magnetic, optical, electromagnetic or be a distribution medium of infrared type. Such media are, for example, semi-conductor memories (Random Access Memory RAM, Read-Only Memory ROM), tapes, magnetic or optical diskettes or disks (Compact Disk-Read Only Memory (CD-ROM), Compact Disk-Read/Write (CD-R/W) and DVD).

The subject of the invention is also a device for measuring the performance of a diagnoser 100, an example of which is shown in FIG. 3. It comprises means 1000 for implementing the method such as described, linked to the diagnoser 100, to the complete knowledge base 11 containing the fault trees 33, the signatures, and associated with the actually transmitted messages 34. These means for implementing the method comprise signature extraction means 82, means 83, 84 for calculating the expected and obtained rates and means 85 for calculating the performance obtained; optionally the module 81 for defining actually transmitted messages is integrated into these means 1000. These means 1000 can be the computer program indicated hereinabove.

The method for measuring the performance of a diagnoser can be applied to various systems under diagnosis. Among the latter may be cited aircraft or certain equipment thereof. The main function of the centralized maintenance of an aircraft is to make, in real time or at the end of the flight, a diagnosis of the general situation of the aircraft with the help of a synthesis of the failure messages received from the various items of equipment of the aircraft.

The invention claimed is:

1. A diagnoser performance measuring system for measuring performance of a diagnoser device of an aircraft system, said diagnoser device including:

a first knowledge base having a first memory that includes data that comprises information related to a set of failures of the aircraft system, effects observed in real-time, during a flight, on the aircraft system caused by the set of failures, and relations between said set of failures and said effects observed; and an algorithmic core in the diagnoser device linked to the first knowledge base, the algorithmic core being configured to generate a diagnosis of the aircraft system;

the diagnoser device being coupled to one or more sensors placed on the aircraft system and configured to transmit one or more messages to the diagnoser device, said messages carrying information about the effects observed on the aircraft system;

the diagnoser performance measuring system comprising:

a supplemental knowledge base having a second memory externally coupled to the diagnoser device, said supplemental knowledge base including, in addition to the data of the first knowledge base, a predetermined list of messages actually transmitted from the one or more sensors of the aircraft system to the diagnoser device, wherein the first knowledge base does not have the predetermined list of messages actually transmitted to the diagnoser device;
a diagnoser performance evaluation computer device configured to carry out a performance evaluation of the diagnoser device and externally coupled to and separate from both the diagnoser device and the supplemental knowledge base, said diagnoser performance evaluation computer device configured to execute computer executable code for:
calculating, at the diagnoser performance evaluation computer device, a first detection rate and a first location rate uniquely representative of a first quality metric of the first knowledge base only, said first detection rate and said first location rate being respectively referred to as an expected detection rate and an expected location rate, said calculating being based upon the supplemental knowledge base,
calculating, at the diagnoser performance evaluation computer device, a second detection rate and a second location rate representative of a second quality metric that is indicative of a quality of the first knowledge base and a quality of the algorithmic core taken together, said second detection rate and said second location rate being respectively referred to as an obtained detection rate and an obtained location rate forming a diagnosis of the aircraft system, said calculating being carried out based upon the messages transmitted to the diagnoser device, said messages being generated from the predetermined list of messages stored in the supplemental knowledge base,
calculating, at the diagnoser performance evaluation computer device, the performance of the diagnoser device as a function of all of the expected and obtained detection rates and of the expected and obtained location rates, and
outputting the calculated performance from the diagnoser performance evaluation computer device to identify individual failures for which the algorithmic core of the diagnoser device has a poor efficiency due to an insufficient number of the one or more sensors or a placement of the one or more sensors based upon the calculated performance of the diagnoser device, and
the first knowledge base being configured to be reimplemented with a knowledge base capture device when the calculated performance calculated by the diagnoser performance evaluation computer device is less than a desired performance.

2. The system of claim 1, wherein the computer device is configured to execute the computer executable code for said calculating of the expected detection and location rates by the following sub-steps:
for each failure of the supplemental knowledge base, said failure being a current failure:
if there exists at least one observed effect, then: calculating the expected detection rate, and assigning the current failure to an ambiguity group which groups together failures having a same signature,
if there does not exist the at least one observed effect, calculating the expected detection rate, when all failures have been evaluated, and
calculating the expected location rates as a function of ambiguities of the ambiguity group.

3. The system of claim 1, wherein the computer device is configured to execute the computer executable code for said calculating the obtained detection and location rates by the following sub-steps:
for each failure being a current failure of the supplemental knowledge base,
extracting a message transmitted for the current failure using the messages transmitted to the diagnoser device,
if the message is not empty,
dispatching the message transmitted to the algorithmic core, and
gathering a diagnosis provided by the algorithmic core, the diagnosis being a "no failure diagnosed" message, or a "single failure diagnosed" message or a "several failures diagnosed" message,
if the "no failure diagnosed" message is gathered, said calculating of the obtained detection rate is performed,
if the "single failure diagnosed" message is gathered, calculating the obtained detection rate and an ambiguity for the current failure,
if the message is empty, calculating the obtained detection rate, when all the failures have been evaluated, calculating the location rates obtained as a function of ambiguities for each said failure.

4. The system of claim 1, wherein the performance of the diagnoser device is measured by calculating a detection efficiency defined by a ratio of the obtained detection rate to the expected detection rate, and a location efficiency defined by a ratio of the obtained location rate to the expected location rate.

5. A computer device for measuring the performance of a diagnoser device of a system, the diagnoser device including:
a first knowledge base that includes information related to a set of failures of the system, effects observed on the system caused by the set of failures, and relations between said failures and said effects observed, and
an algorithmic core,
wherein said computer device comprises means for implementing the system according to claim 1, linked to a supplemental knowledge base that includes a copy of the first knowledge base and a predetermined list of the messages transmitted.

6. The computer device for measuring the performance of a diagnoser device according to claim 5, wherein the means for implementing the method comprise signature extraction means, a module for generating transmitted messages from the predetermined list of messages transmitted stored in the supplemental knowledge base, and means for calculating the expected and obtained detection and location rates and means for calculating the performance obtained.

7. A non-transitory computer readable medium comprising a computer program product, said computer program comprising code instructions to implement the system of claim 1, when said code instructions are executed on a computer.

8. A diagnoser performance measuring system for measuring performance of a diagnoser device of an aircraft system, said diagnoser device including:
a first knowledge base having a first memory that includes data that comprises information related to a set of failures of the aircraft system, effects observed in real-time, during a flight, on the aircraft system caused by the set of failures, and relations between said set of failures and said effects observed; and an algorithmic core in the diagnoser device linked to the first knowledge base, the algorithmic core being configured to generate a diagnosis of the aircraft system;

the diagnoser device being coupled to one or more sensors placed on the aircraft system and configured to transmit one or more messages to the diagnoser device, said messages carrying information about the effects observed on the aircraft system;

the diagnoser performance measuring system comprising:

a supplemental knowledge base having a second memory externally coupled to the diagnoser device, said supplemental knowledge base including, in addition to the data of the first knowledge base, a predetermined list of messages actually transmitted from the one or more sensors of the aircraft system to the diagnoser device, wherein the first knowledge base does not have the predetermined list of messages actually transmitted to the diagnoser device;

a diagnoser performance evaluation computer device configured to carry out a performance evaluation of the diagnoser device and externally coupled to and separate from both the diagnoser device and the supplemental knowledge base, said diagnoser performance evaluation computer device configured to execute computer executable code for:

calculating, at the diagnoser performance evaluation computer device, a first detection rate and a first location rate uniquely representative of a first quality metric of the first knowledge base only, said first detection rate and said first location rate being respectively referred to as an expected detection rate and an expected location rate, said calculating being based upon the supplemental knowledge base, calculating, at the diagnoser performance evaluation computer device, a second detection rate and a second location rate representative of a second quality metric that is indicative of a quality of the first knowledge base and a quality of the algorithmic core taken together, said second detection rate and said second location rate being respectively referred to as an obtained detection rate and an obtained location rate forming a diagnosis of the aircraft system, said calculating being carried out based upon the messages transmitted to the diagnoser device, said messages being generated from the predetermined list of messages stored in the supplemental knowledge base, calculating, at the diagnoser performance evaluation computer device, the performance of the diagnoser device as a function of all of the expected and obtained detection rates and of the expected and obtained location rates, and outputting from the diagnoser performance evaluation computer device the calculated performance to identify individual failures for which the algorithmic core of the diagnoser device has a poor efficiency due to a lack of precision of the diagnoser device based upon the calculated performance of the diagnoser device, and the first knowledge base being configured to be reimplemented with a knowledge base capture device when the calculated performance calculated by the diagnoser performance evaluation computer device is less than a desired performance.

9. A diagnoser performance measuring system for measuring performance of a diagnoser device of an aircraft system, said diagnoser device including:

a first knowledge base having a first memory that includes data that comprises information related to a set of failures of the aircraft system, effects observed in real-time, during a flight, on the aircraft system caused by the set of failures, and relations between said set of failures and said effects observed; and an algorithmic core in the diagnoser device linked to the first knowledge base, the algorithmic core being configured to generate a diagnosis of the aircraft system;

the diagnoser device being coupled to one or more sensors placed on the aircraft system and configured to transmit one or more messages to the diagnoser device, said messages carrying information about the effects observed on the aircraft system;

the diagnoser performance measuring system comprising:

a supplemental knowledge base having a second memory externally coupled to the diagnoser device, said supplemental knowledge base including, in addition to the data of the first knowledge base, a predetermined list of messages actually transmitted from the one or more sensors of the aircraft system to the diagnoser device, wherein the first knowledge base does not have the predetermined list of messages actually transmitted to the diagnoser device;

a diagnoser performance evaluation computer device configured to carry out a performance evaluation of the diagnoser device and externally coupled to and separate from both the diagnoser device and the supplemental knowledge base, said diagnoser performance evaluation computer device configured to execute computer executable code for:

calculating, at the diagnoser performance evaluation computer device, a first detection rate and a first location rate uniquely representative of a first quality metric of the first knowledge base only, said first detection rate and said first location rate being respectively referred to as an expected detection rate and an expected location rate, said calculating being based upon the supplemental knowledge base, calculating, at the diagnoser performance evaluation computer device, a second detection rate and a second location rate representative of a second quality metric that is indicative of a quality of the first knowledge base and a quality of the algorithmic core taken together, said second detection rate and said second location rate being respectively referred to as an obtained detection rate and an obtained location rate forming a diagnosis of the aircraft system, said calculating being carried out based upon the messages transmitted to the diagnoser device, said messages being generated from the predetermined list of messages stored in the supplemental knowledge base, calculating, at the diagnoser performance evaluation computer device, the performance of the diagnoser device as a function of all of the expected and obtained detection rates and of the expected and obtained location rates, and outputting the calculated performance from the diagnoser performance evaluation computer device to identify individual failures for which the algorithmic core of the diagnoser device has a poor efficiency based upon the calculated performance of the diagnoser device, and the first knowledge base being configured to be reimplemented with a knowledge base capture device when the calculated performance calculated by the diagnoser performance evaluation computer device is less than a desired performance, wherein the performance of the diagnoser device is measured by calculating a detection efficiency defined by a ratio of the obtained detection rate to the expected detection rate, and a location efficiency defined by a ratio of the obtained location rate to the expected location rate.

\* \* \* \* \*